(12) United States Patent
Yamasaki et al.

(10) Patent No.: US 11,062,641 B2
(45) Date of Patent: Jul. 13, 2021

(54) DISPLAY DEVICE AND IMAGE CAPTURING DEVICE

(71) Applicant: CANON KABUSHIKI KAISHA, Tokyo (JP)

(72) Inventors: Takahiro Yamasaki, Tachikawa (JP); Takashi Muto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/669,675

(22) Filed: Oct. 31, 2019

(65) Prior Publication Data

US 2020/0143734 A1 May 7, 2020

(30) Foreign Application Priority Data

Nov. 7, 2018 (JP) .............................. JP2018-209931

(51) Int. Cl.
*G09G 3/20* (2006.01)
*H04N 5/232* (2006.01)
*G09G 3/36* (2006.01)

(52) U.S. Cl.
CPC ....... *G09G 3/2085* (2013.01); *H04N 5/23293* (2013.01); *G09G 2310/0286* (2013.01)

(58) Field of Classification Search
CPC ......... G09G 3/2085; G09G 2310/0286; G09G 2310/0297; G09G 2310/0294; G09G 3/3677; G09G 2310/08; G09G 3/3666; G09G 3/2088; G09G 3/00; G09G 2310/00; G09G 2310/02; G09G 2310/0202; G09G 2310/0208; G09G 2310/021; G09G 2310/0213; G09G 2310/0216; G09G 2310/0243; G09G 2310/0264; G09G 2310/027; G09G 2310/0278; H04N 5/23293
See application file for complete search history.

(56) References Cited

U.S. PATENT DOCUMENTS

| 6,130,657 A | 10/2000 | Kurokawa et al. |
| 6,825,826 B1 * | 11/2004 | Mikami ............... G09G 3/3688 |
| | | 345/98 |
| 7,859,509 B2 | 12/2010 | Ueda |
| 9,483,131 B2 | 11/2016 | Hong et al. |

(Continued)

FOREIGN PATENT DOCUMENTS

| JP | H10-282939 A | 10/1998 |
| JP | 2007-272127 A | 10/2007 |
| JP | 2013-231939 A | 11/2013 |

*Primary Examiner* — Albert H Cutler
(74) *Attorney, Agent, or Firm* — Venable LLP

(57) ABSTRACT

A display device includes signal supply circuit having N blocks and data supply circuit for supplying data to the N blocks. Each block includes holding block having k data holders for supply signals to k columns, and scanning circuit block for sequentially selecting the k data holders to receive data from the data supply circuit. The scanning circuit block includes k-stage shift register formed from k registers. Scanning circuit is formed by N scanning circuit blocks each arranged in one of the N blocks, and sequentially selects the N holding blocks each arranged in one of the N blocks to sequentially select the k data holders of each selected holding block to receive data. In response to output from i-th register of n-th block, the data supply circuit sets (n+1)-th block in operation-enabled state.

9 Claims, 10 Drawing Sheets

(56) References Cited

U.S. PATENT DOCUMENTS

| | | | |
|---|---|---|---|
| 2005/0276369 A1* | 12/2005 | Mutaguchi | G11C 29/86 377/64 |
| 2007/0182688 A1* | 8/2007 | Jang | G11C 19/28 345/98 |
| 2007/0242027 A1 | 10/2007 | Ueda | |
| 2009/0160849 A1* | 6/2009 | Kiya | G09G 3/3696 345/214 |
| 2012/0127143 A1* | 5/2012 | Gondo | G09G 3/3648 345/208 |
| 2013/0285998 A1 | 10/2013 | Hong et al. | |
| 2015/0339962 A1* | 11/2015 | Ryu | G09G 3/20 345/208 |
| 2017/0213519 A1* | 7/2017 | Chang | G09G 3/3688 |
| 2018/0151143 A1* | 5/2018 | Kim | G06F 3/04184 |
| 2018/0342210 A1* | 11/2018 | Choi | G09G 3/3696 |
| 2019/0147800 A1* | 5/2019 | Bae | G09G 3/3666 345/173 |

* cited by examiner

DISPLAY DEVICE AND IMAGE CAPTURING DEVICE

BACKGROUND OF THE INVENTION

Field of the Invention

The present invention relates to a display device and an image capturing device.

Description of the Related Art

Japanese Patent Laid-Open No. 10-282939 discloses a liquid crystal display device that includes a plurality of segment drivers that drive a plurality of data lines individually. In this liquid crystal display device, the plurality of segment drivers output display data of one line. Each segment driver starts an operation to read the display data in accordance with a carry signal and stops the operation when the reading of the display data has been completed. A segment driver which does not receive a carry signal input does not operate since this driver is not required to read the display data.

The operating frequency has increased due to the increase in the refresh rates of display devices. In an arrangement in which a drive circuit that reads a data of one row and supplies signals to pixels of one row is divided into a plurality of blocks, and the operation state is switched between an operating state and a non-operating state for each block, the data supply to each block may not be able to keep up if the operating frequency is increased.

SUMMARY OF THE INVENTION

The present invention provides a technique advantageous in increasing an operating frequency.

One of aspects of the present invention provides a display device comprising: a plurality of pixels arranged so as to form a plurality of rows and a plurality of columns; a row selection circuit configured to select a row among the plurality of rows; and a signal supply circuit configured to supply a signal to each pixel of the row selected from the plurality of pixels by the row selection circuit, wherein the signal supply circuit includes N blocks and a data supply circuit configured to supply data to the N blocks, each of the N blocks includes a holding block including k data holders configured to supply signals to k columns of the plurality of columns, and a scanning circuit block configured to sequentially select the k data holders to receive data from the data supply circuit, and the scanning circuit block includes a k-stage shift register formed from k registers which are connected in series, a scanning circuit is formed by connecting, in series, N scanning circuit blocks, each of which is arranged in the corresponding one of the N blocks, and the scanning circuit sequentially selects the N holding blocks, each of which is arranged in the corresponding one of the N blocks, to sequentially select the k data holders of each selected holding block to receive data, and for i<k, in response to an output from an i-th register of an n-th block from the first block, of the N blocks, in the scanning direction of the scanning circuit, the data supply circuit sets an (n+1)-th block from the first block of the N blocks in an operation-enabled state.

Further features of the present invention will become apparent from the following description of exemplary embodiments with reference to the attached drawings.

DESCRIPTION OF THE EMBODIMENTS

An exemplary embodiment of the present invention will be described hereinafter with reference to the accompanying drawings.

Figure 1:
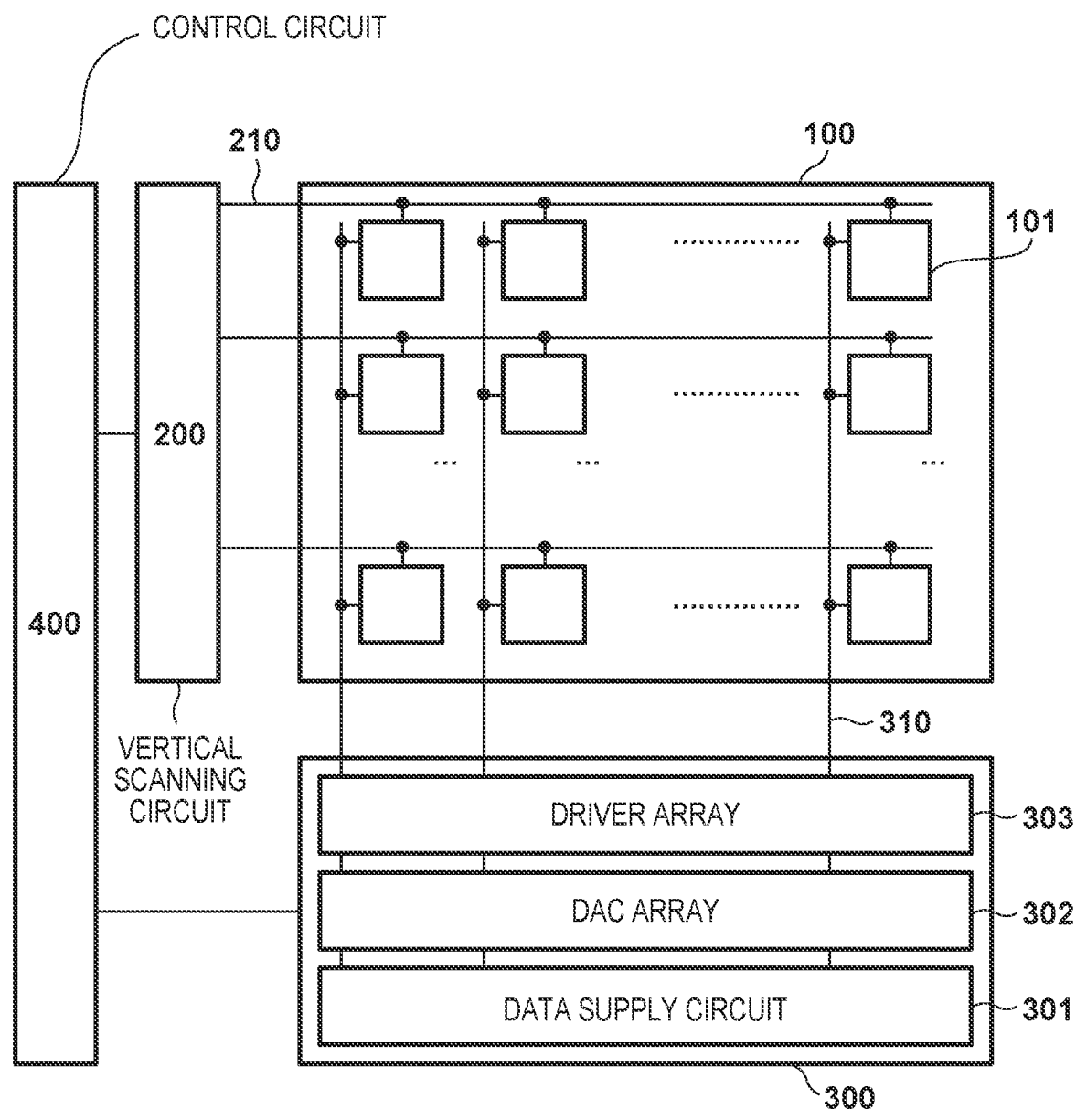
FIG. 1 is a block diagram showing the arrangement of a display device according to an embodiment of the present invention.

FIG. 1 shows the arrangement of a display device 1 according to an embodiment of the present invention. The display device 1 can include a pixel array 100, a vertical scanning circuit (row selection circuit) 200, the signal supply circuit 300, and control circuit 400. The pixel array 100 includes a plurality of pixels 101 arranged so as to form a plurality of rows and a plurality of columns. Each pixel 101 can include a plurality of subpixels (for example, an R subpixel, a G subpixel, and a B subpixel). The vertical scanning circuit (row selection circuit) 200 selects a row among the plurality of rows in the pixel array 100. The vertical scanning circuit 200 performs row selection by supplying a control signal to each of the pixels 101 of one row (the subpixels of one row) forming the row to be selected via a scanning line 210 corresponding to that row. The signal supply circuit 300 supplies, via signal lines 310, signals (luminance signals) to the pixels 101 corresponding to the one row selected by the vertical scanning circuit 200. The vertical scanning circuit 200 and the signal supply circuit 300 are controlled by the control circuit 400.

The signal supply circuit 300 can include a data supply circuit 301, a DAC (digital-to-analog converter) array 302, and a driver array 303. The signal supply circuit 300 supplies, in each horizontal scanning period, data (luminance data) to be supplied to the pixel 101 on the one row (subpixels on the one row) to the DAC array 302. The DAC array 302 includes a number of D/A conversion circuits corresponding to the number of the pixels 101 on the one row (subpixels on the one row), converts the data (digital data) supplied from the signal supply circuit 300 into an analog signal (luminance signal), and supplies the converted signal to the driver array 303. The driver array 303 includes a number of column drivers corresponding to the number of pixels 101 on the one row (subpixels on the one row), and supplies, to the plurality of signal lines 310, a signal (for example, a voltage signal indicating the luminance) corresponding to the signal supplied from the DAC array 302.

Figure 2:
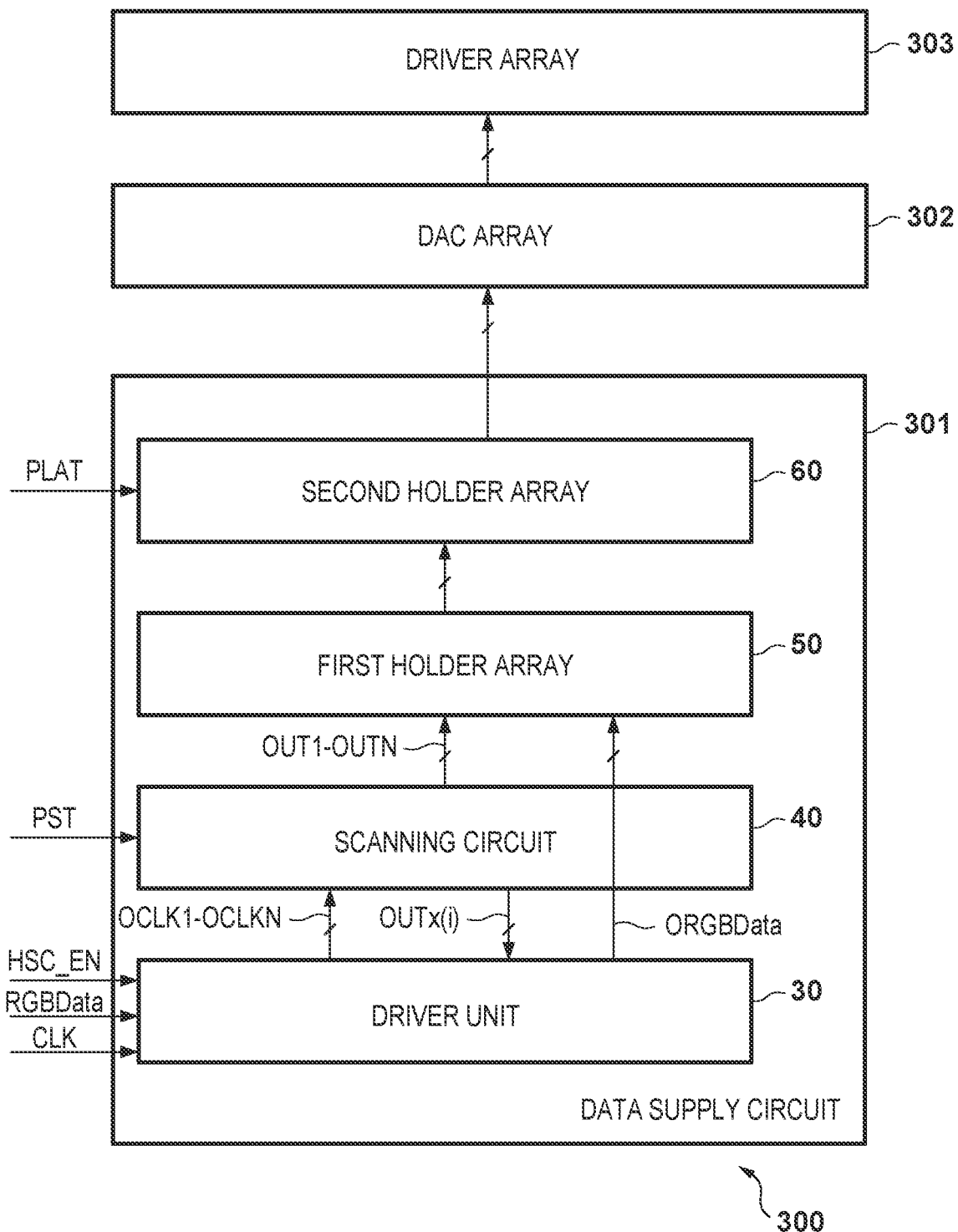
FIG. 2 is a block diagram showing an example of the arrangement of a data supply circuit of a signal supply circuit.

FIG. 2 shows an example of the arrangement of the data supply circuit 301 of the signal supply circuit 300. The data supply circuit 301 can include a driver unit 30, a scanning circuit 40, a first holder array 50, and a second holder array 60. The driver unit 30 receives an enable signal HSC_EN, RGB data RGBData, a reference clock signal CLK, and a timing signal OUTx(i) and supplies clock signals OCLK1 to OCLKN and RGB data ORGBData to the scanning circuit 40. In this case, the enable signal HSC_EN is supplied from, for example, the control circuit 400. The RGB data RGBData is supplied from, for example, an external device (an image data supplying device) of the display device 1. The reference clock signal CLK may be supplied from, for example, the external device or may be generated in the display device 1. The timing signal OUTx(i) is supplied from the scanning circuit 40. The RGB data RGBData can include R data RData which is the luminance data of R (red), G data GData which is the luminance data of G (green), and B data BData which is the luminance data of B (blue). Each of the clock signals OCLK1 to OCLKN is generated based on the reference clock signal CLK. The circuit formed by the scanning circuit 40, the first holder array 50, and the second holder array 60 is divided in to first to N-th blocks BLK, and each of 1 and N added to the character string OCLK is an index used to specify a block. The RGB data ORGBData can include R data ORData which is the luminance data of R (red), G data OGData which is the luminance data of G (green), and B data OBData which is the luminance data of B (blue).

The scanning circuit 40 includes a shift register, and the shift register outputs write signals OUT1 to OUTN upon receiving a pulse of a shift start signal PST from the control circuit 400 and executing a shift operation in accordance with the clock signal OCLK1 to OCLKN. Each of 1 and N added to the character string OUT is an index used to specify the corresponding block BLK. The write signal OUT1 is formed by write signals OUT1(0) to OUT1($k$). The write signal OUT2 is formed by write signals OUT2(0) to OUT2 ($k$). The write signal OUTi is formed by OUTi(0) to OUTi($k$). k denotes the number of columns handled in each block. i is an index for specifying a block. The columns are the columns in the pixel array 100 on which a plurality of pixels 101 are arranged so as to form a plurality of rows and a plurality of columns. One signal line 310 is assigned to each column. The one signal line 310 can include a number of sub-signal lines corresponding to the plurality of subpixels (the R subpixel, the G subpixel, and the B subpixel) forming one pixel 101.

The first holder array 50 includes a plurality of data holders, receives, in accordance with the write signals OUT1 to OUTN, the RGB data ORGBData supplied from the driver unit 30, and supplies the received RGB data to the second holder array 60. The second holder array 60 includes a plurality of data holders, receives at once, in accordance with a latch signal PLAT supplied from the control circuit 400, the RGB data supplied from the first holder array 50, and outputs the received RGB data to the DAC array 302.

Figure 3:
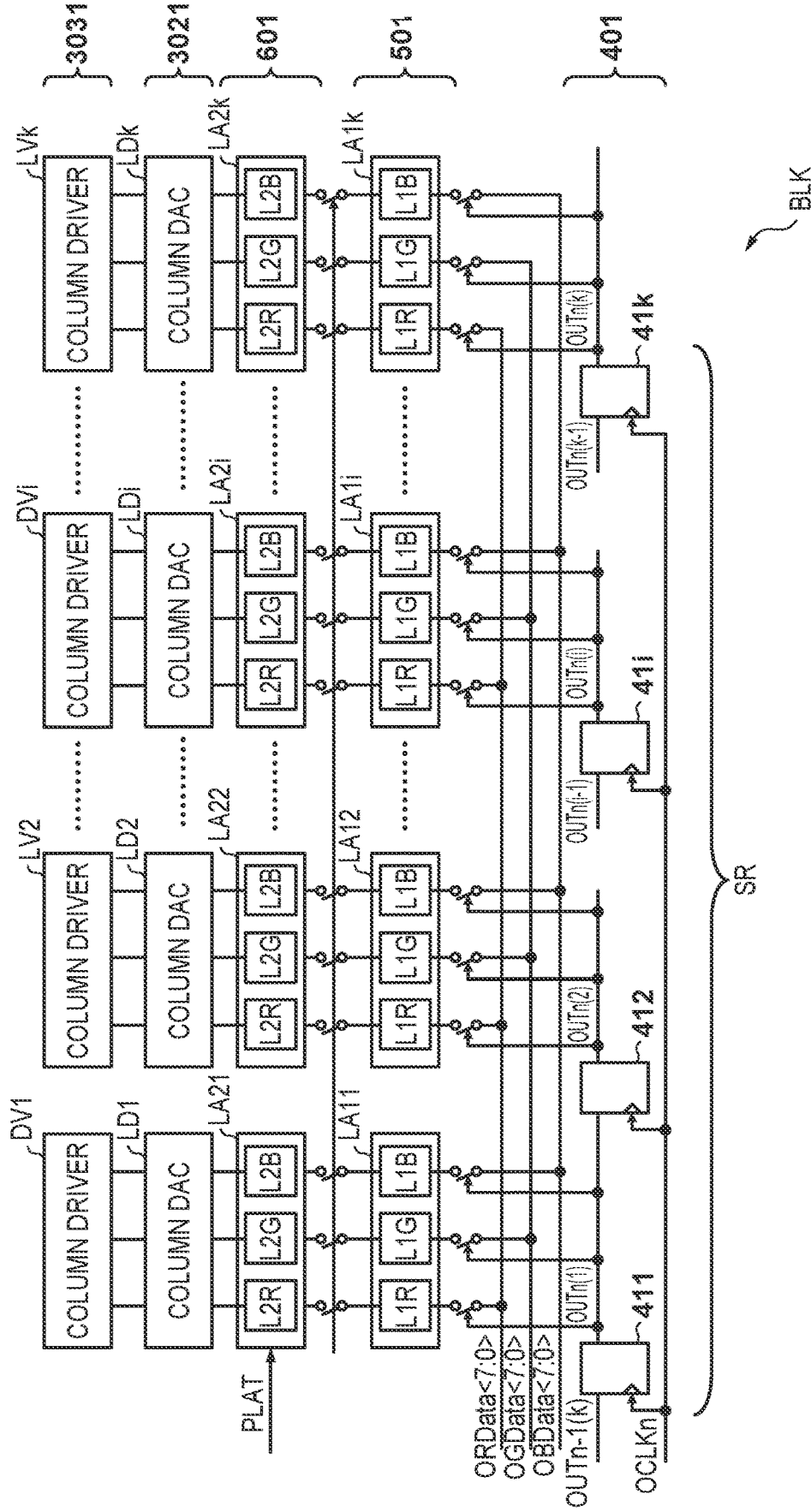
FIG. 3 is a block diagram showing an example of the arrangement of an n-th block BLK which is the n-th block BLK of N blocks BLK forming a circuit that is formed by a scanning circuit, a first holder array and a second holder array.
Figure 4:
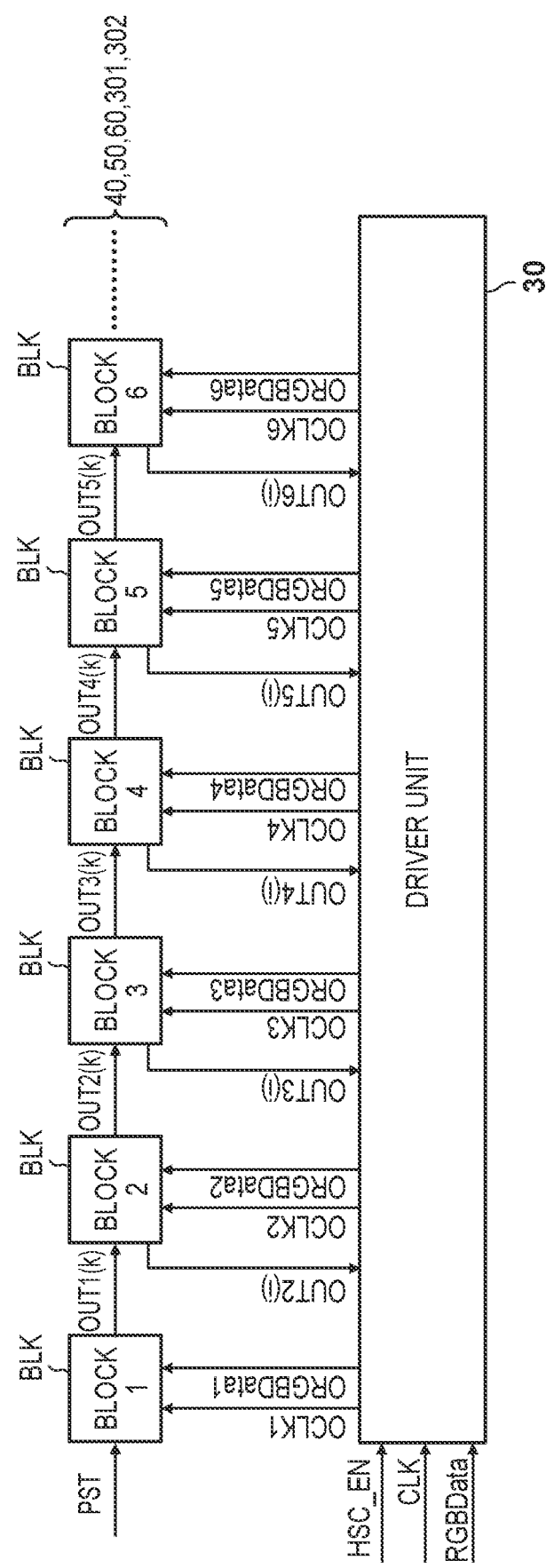
FIG. 4 is a block diagram showing an example of the connection between a driver unit and a plurality of blocks.
Figure 5:
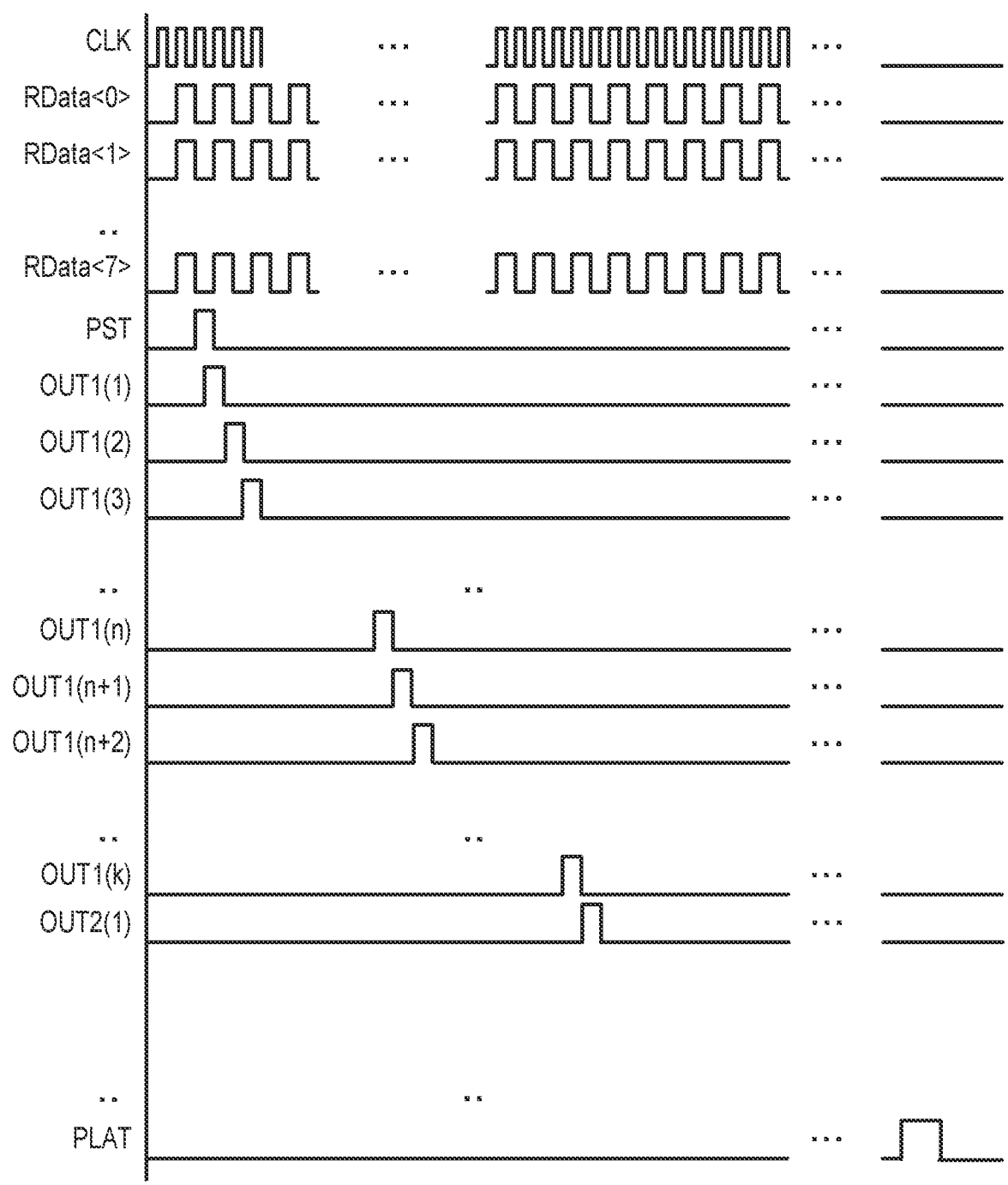
FIG. 5 is a timing chart showing an example of the operation of the data supply circuit of the signal supply circuit.

As described above, the circuit formed by the scanning circuit 40, the first holder array 50, and the second holder array 60 is divided into N blocks BLK, that is, first to N-th blocks BLK. FIG. 3 shows an example of the arrangement of an N-th block BLK which is the n-th block BLK of the N blocks BLK forming the circuit formed by the scanning circuit 40, the first holder array 50, and the second holder array 60. FIG. 4 shows an example of the connection between the driver unit 30 and the plurality of blocks BLK. FIG. 5 shows an operation example of the data supply circuit 301 of the signal supply circuit 300. Note that only RData<7:0> of RData<7:0>, GData<7:0>, BData<7:0> forming the RGB data RGBData is shown as RData<0> . . . RData<7> in FIG. 5. Note that although RData<7:0> is arbitrary data, it is shown as data expressed by 1, 0, 1, 0 . . . for the sake of descriptive convenience in this example.

The arrangements of the first to N-th blocks BLK can be identical to each other. n is a number obtained by counting each block from the first block in the scanning direction of the scanning circuit 40. The n-th block BLK supplies a signal to k columns. Although the present invention does not exclude an arrangement in which the value of k differs for the first to N-th blocks BLK, the value of k is normally the same for each of the first to N-th blocks BLK, and thus assume that such an example will be described hereinafter.

Each of the first to N-th blocks BLK can include a scanning circuit block 401 which forms a part of the scanning circuit 40 and a holding block 501 which forms a part of the first holder array 50. Each of the first to N-th blocks BLK can also include a holding block 601 which forms a part of the second holder array 60. In addition, each of the first to N-th blocks BLK can include a DAC block 3021 which forms a part of the DAC array 302. Each of the first to N-th blocks BLK can also include a driver block 3031 which forms a part of the driver array 303. The scanning circuit 40 is formed by N scanning circuit blocks 401, the first holder array 50 is formed by N holding blocks 501, and the second holder array 60 is formed by N holding blocks 601. In addition, the driver array 303 is formed by N driver blocks 3031.

Each holding block 501 includes k data holders LA11 to LA1$k$ for supplying signals to k columns of the plurality of columns. Each holding block 601 includes k data holders LA21 to LA2$k$ for supplying signals to k columns of the plurality of columns. Each scanning circuit block 401 sequentially selects the k data holders LA11 to LA1$k$ to receive data from the data supply circuit 301.

The scanning circuit 40 is formed by connecting the first to N-th scanning circuit blocks 401 in series, and the pulse of the shift start signal PST is supplied to the first scanning circuit block 401 which is the top scanning circuit block of the first to N-th scanning circuit blocks. The scanning circuit 40 sequentially selects the N first holding blocks 501 which are arranged in the first to N-th blocks BLK, respectively, while sequentially selecting the k data holder LA11 to LA1$k$ of each first holding block 501 and causing them to receive data. Each scanning circuit block 401 includes a k-stage shift register SR formed by k flip-flops 411 to 41$k$ (registers) which are connected in series. Each of the flip-flops 411 to 41$k$ performs a shift operation in accordance with a clock signal OCLKn. The output terminal of the k-th data holder LA1$k$ of an (n−1)-th scanning circuit block 401 of an (n−1)-th block BLK is connected to the input terminal of the data holder LA11 of an n-th scanning circuit block 401 of an n-th block BLK. The pulse of the scanning circuit block 401 is supplied to the first data holder LA11 of the first scanning circuit block 401 of the first block BLK. An i-th flip-flop 41$i$ of the n-th scanning circuit block 401 of the shift register SR outputs a write signal OUTn(k). That is, write signals OUTn(1) to OUTn(k) are sequentially activated by the N scanning circuit blocks 401 or the shift register SR on a predetermined period (a period corresponding to one cycle of the clock signal OCLKn) basis in accordance with the clock signal OCLKn.

Each of the k data holders LA11 to LA1k receives and holds ORData<7:0>, OGData<7:0>, and OBData<7:0> in accordance with the input of a write signal OUTn(i) (i is one of 1 to k). Each of the first data holders LA11 to LAK1k outputs the same data as the held data. In this example, each of the ORData, the OGData, and the OBData are formed as 8-bit data, and each of the first data holders LA11 to LA1k holds 24-bit data. However, the number of bits of each set of data is not limited to this example and can be determined arbitrarily.

After the data has been held by all of the data holder LA11 to LA1k of each of the N holding blocks 501 forming the first holder array 50, activation is performed over a predetermined period by the latch signal PLAT. As a result, the sets of data held by the first holder array 50 are received and held at once by the N holding blocks 601 forming the second holder array 60. Subsequently, the N DAC blocks 3021 forming the DAC array 302 convert the data (digital data) corresponding to one row and are held by the second holder array 60 into analog signals (luminance signals) and supply the converted data to the driver array 303. The driver array 303 supplies signals (for example, voltage signals indicating the luminance), corresponding to the signals supplied from the DAC array 302, to the plurality of signal lines 310.

Figure 6:
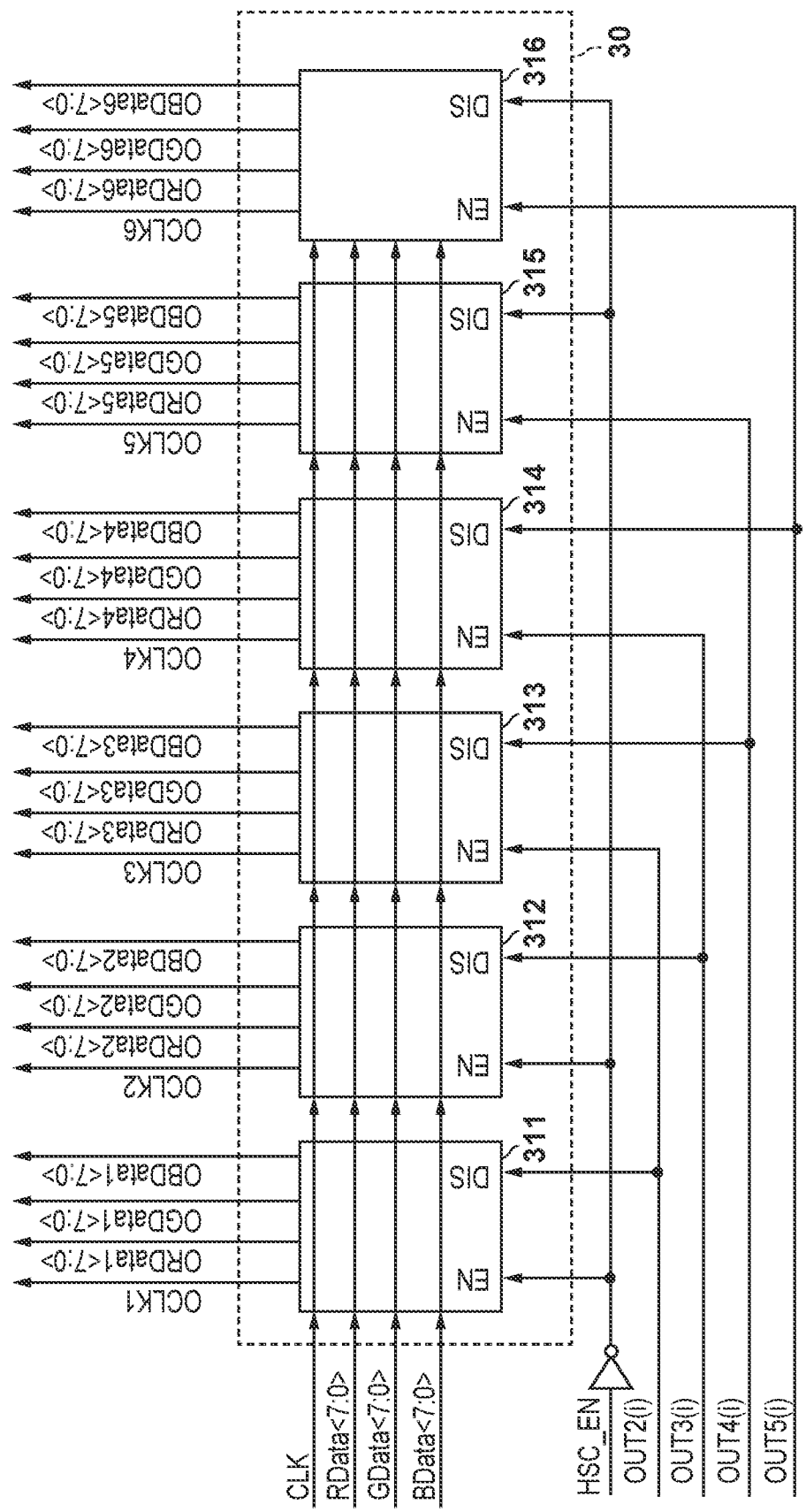
FIG. 6 is a block diagram showing an example of the driver unit.

FIG. 6 shows an example of the arrangement of the driver unit 30. In this case, an example in which N=6, that is, an example in which the circuit forming the scanning circuit 40, the first holder array 50, and the second holder array 60 is divided into 6 blocks BLK will be described for the sake of descriptive convenience. The driver unit 30 includes N (6 in this example) drive circuits, that is, first to sixth drive circuits 311 to 316. A write signal (the write signal OUTx(i) of FIG. 1), which is selected from the write signals OUTn(0) to OUTn(k) generated by the scanning circuit 40, is supplied to each of the first to sixth drive circuit 311 to 316.

The enable signal HSC_EN and a write signal OUT2(*i*) generated by the second block BLK (of the corresponding scanning circuit block 401) are supplied to the first drive circuit 311. The write signal OUT2(*i*) is smaller than k of the second block BLK (that is, i<k). The first drive circuit 311 starts the operation of the first block BLK in accordance with the enable signal HSC_EN and drives a clock signal CLK1, R data ORData1, G data OGData1, and B data OBData1 so that the operation of the first block BLK will be completed in accordance with the write signal OUT2(*i*).

The enable signal HSC_EN and a write signal OUT3(*i*) generated by the third block BLK (of the corresponding scanning circuit block 401) are supplied to the second drive circuit 312. The write signal OUT3(*i*) is smaller than k of the third block BLK (that is, i<k). The second drive circuit 312 starts the operation of the second block BLK in accordance with the enable signal HSC_EN and drives a clock signal CLK2, R data ORData2, G data OGData2, and B data OBData2 so that the operation of the second block BLK will be completed in accordance with the write signal OUT3(*i*).

The write signal OUT2(*i*) generated by the second block BLK (of the corresponding scanning circuit block 401) and a write signal OUT4(*i*) generated by the fourth block BLK (of the corresponding scanning circuit block 401) are supplied to the third drive circuit 313. The write signal OUT2(*i*) is smaller than k of the second block BLK (that is, i<k). The write signal OUT4(*i*) is also smaller than k of the fourth block BLK (that is, i<k). The third drive circuit 313 starts the operation of the third block BLK in accordance with the write signal OUT2(*i*) and drives a clock signal CLK3, R data ORData3, G data OGData3, and B data OBData3 so that the operation of the third block BLK will be completed in accordance with the write signal OUT4(*i*).

The write signal OUT3(*i*) generated by the third block BLK (of the corresponding scanning circuit block 401) and a write signal OUT5(*i*) generated by the fifth block BLK (of the corresponding scanning circuit block 401) are supplied to the fourth drive circuit 314. The write signal OUT3(*i*) is smaller than k of the third block BLK (that is, i<k). The write signal OUT5(*i*) is also smaller than k of the fifth block BLK (that is, i<k). The fourth drive circuit 314 starts the operation of the fourth block BLK in accordance with the write signal OUT3(*i*) and drives a clock signal CLK4, R data ORData4, G data OGData4, and B data OBData4 so that the operation of the fourth block BLK will be completed in accordance with the write signal OUT5(*i*).

The write signal OUT4(*i*) generated by the fourth block BLK (of the corresponding scanning circuit block 401) and the enable signal HSC_EN are supplied to the fifth drive circuit 315. The write signal OUT4(*i*) is smaller than k of the fourth block BLK (that is, i<k). The fifth drive circuit 315 starts the operation of the fifth block BLK in accordance with the write signal OUT4(*i*) and drives a clock signal CLK5, R data ORData5, G data OGData5, and B data OBData5 so that the operation of the fifth block BLK will be completed in accordance with the enable signal HSC_EN.

The write signal OUT5(*i*) generated by the fifth block BLK (of the corresponding scanning circuit block 401) and the enable signal HSC_EN are supplied to the sixth drive circuit 316. The write signal OUT5(*i*) is smaller than k of the fifth block BLK (that is, i<k). The sixth drive circuit 316 starts the operation of the sixth block BLK in accordance with the write signal OUT5(*i*) and drives a clock CLK6, R data ORData6, G data OGData6, and B data OBData6 so that the operation of the sixth block BLK will be completed in accordance with the enable signal HSC_EN.

Figure 7:
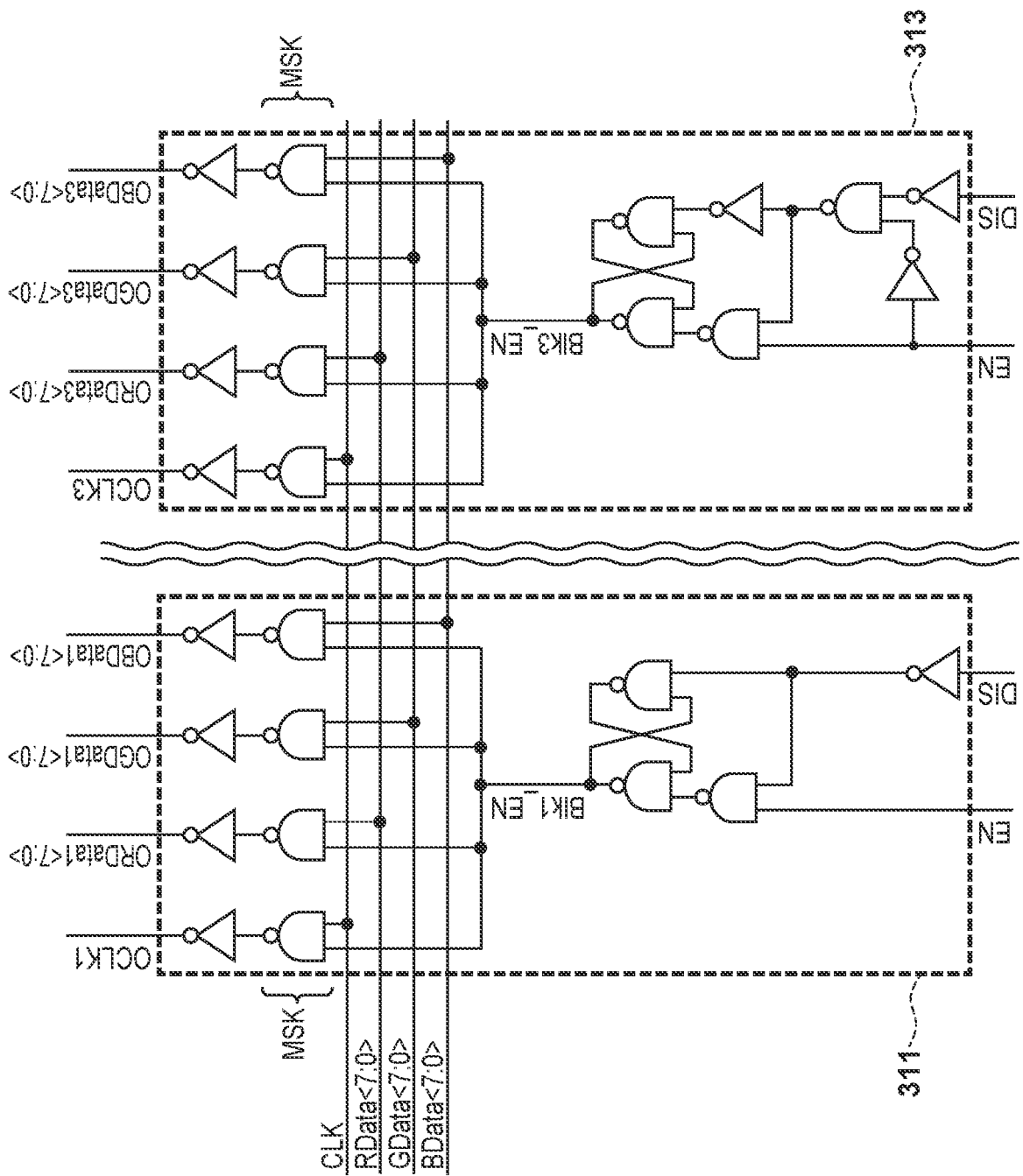
FIG. 7 is a block diagram showing an example of the arrangement of a first drive circuit and a third drive circuit.
Figure 8:
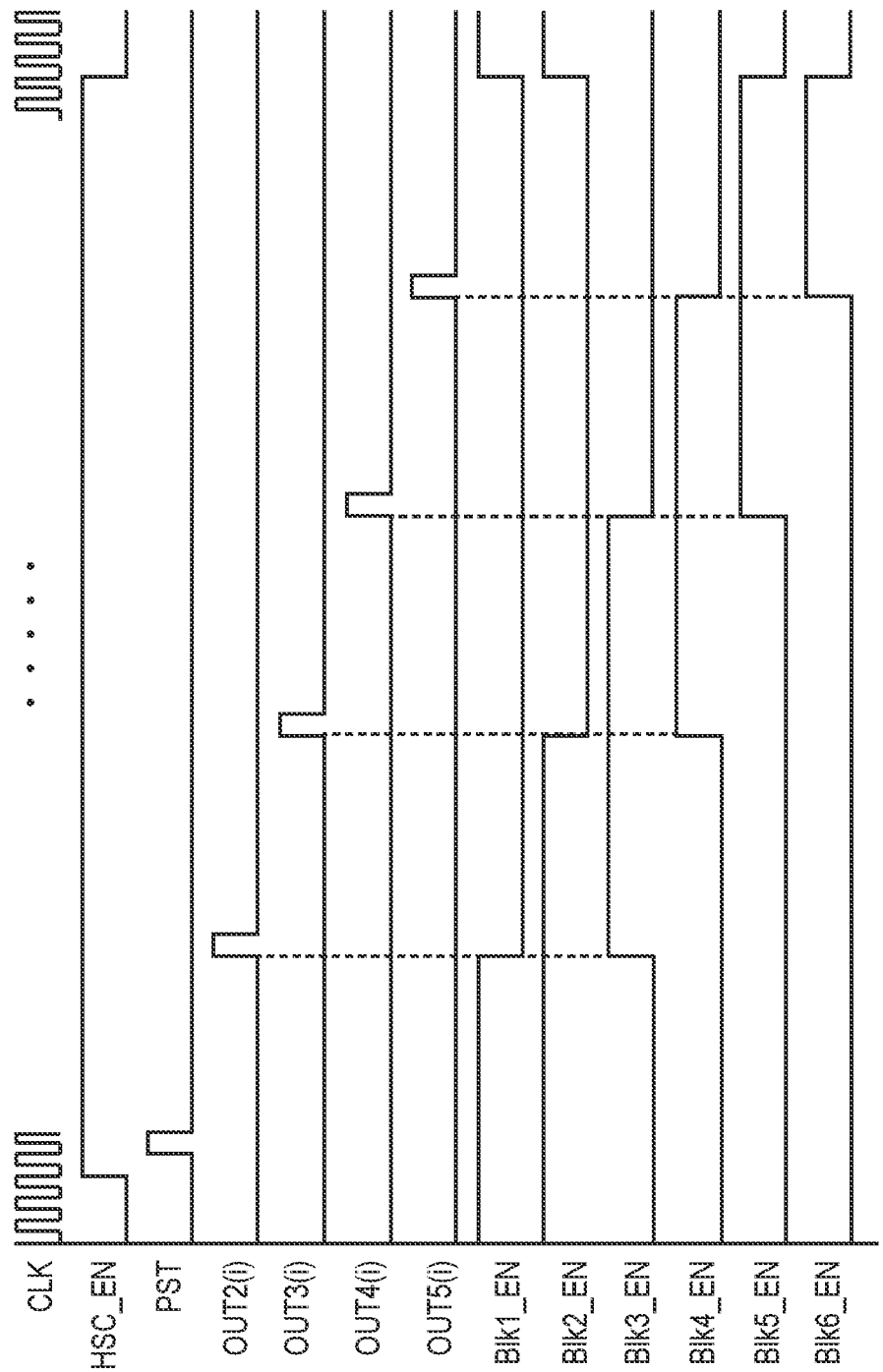
FIG. 8 is a timing chart showing an example of the operation of the driver unit.

FIG. 7 shows an example of the arrangement of the first drive circuit 311 and the third drive circuit 313. The first drive circuit 311 and the second drive circuit 312 can be arranged in a similar manner to each other. The third to sixth drive circuits 313 to 316 can be arranged in a similar manner to each other. FIG. 8 shows an operation example of the driver unit 30. In one example, assume that k=60 and i=k/2=30.

In the first drive circuit 311, a block enable signal Blk1_EN is activated in response to the enable signal HSC_EN supplied to an EN terminal and the write signal OUT2(*i*) supplied to an DIS terminal. Also, while the block enable signal Blk1_EN is activated, the first drive circuit 311 drives the clock signal CLK1, the R data ORData1, the G data OGData1, and the B data OBData1 in accordance with the clock signal CLK, the R data RData, the G data GData, and the B data BData.

In the second drive circuit 312, a block enable signal Blk2_EN is activated in response to the enable signal HSC_EN supplied to an EN terminal and the write signal OUT3(*i*) supplied to an DIS terminal. Also, while the block enable signal Blk2_EN is activated, the second drive circuit 312 drives the clock signal CLK2, the R data ORData2, the G data OGData2, and the B data OBData2 in accordance with the clock signal CLK, the R data RData, the G data GData, and the B data BData.

In the third drive circuit 313, a block enable signal Blk3_EN is activated in response to the write signal OUT2(*i*) supplied to an EN terminal and the write signal OUT4(*i*)

supplied to an DIS terminal. Also, while the block enable signal Blk3_EN is activated, the third drive circuit 313 drives the clock signal CLK3, the R data ORData3, the G data OGData3, and the B data OBData3 in accordance with the clock signal CLK, the R data RData, the G data GData, and the B data BData.

In the fourth drive circuit 314, a block enable signal Blk4_EN is activated in response to the write signal OUT3 (*i*) supplied to an EN terminal and the write signal OUT5(*i*) supplied to an DIS terminal. Also, while the block enable signal Blk4_EN is activated, the fourth drive circuit 314 drives the clock signal CLK4, the R data ORData4, the G data OGData4, and the B data OBData4 in accordance with the clock signal CLK, the R data RData, the G data GData, and the B data BData.

In the fifth drive circuit 315, a block enable signal Blk5_EN is activated in response to the write signal OUT4 (*i*) supplied to an EN terminal and the enable signal HSC_EN supplied to an DIS terminal. Also, while the block enable signal Blk5_EN is activated, the fifth drive circuit 315 drives the clock signal CLK5, the R data ORData5, the G data OGData5, and the B data OBData5 in accordance with the clock signal CLK, the R data RData, the G data GData, and the B data BData.

In the sixth drive circuit 316, a block enable signal Blk6_EN is activated in response to the write signal OUT5 (*i*) supplied to an EN terminal and the enable signal HSC_EN supplied to an DIS terminal. Also, while the block enable signal Blk6_EN is activated, the sixth drive circuit 316 drives the clock signal CLK6, the R data ORData6, the G data OGData6, and the B data OBData6 in accordance with the clock signal CLK, the R data RData, the G data GData, and the B data BData.

Each of the drive circuits 311 to 316 of the driver unit 30 includes a mask circuit MSK that outputs data corresponding to the input data in the enabled state and outputs a fixed value in the disabled state. For example, the mask circuit MSK of an n-th drive circuit 31*n* will output data corresponding to the R data RData, the G data GData, and the B data BData to the data lines of ORDatan, OGDatan, and OBDatan, respectively, in the enabled state in which the block enable signal Blkn_EN has been activated. The mask circuit MSK of the n-th drive circuit 31*n* outputs a fixed value to each of the data lines of ORDatan, OGDatan, and OBDatan in the disabled state in which the block enable signal Blkn_EN has been deactivated. In addition, the mask circuit MSK of the n-th drive circuit 31*n* outputs a clock signal corresponding to the reference clock signal CLK to the signal line of the clock signal CLKn in the enabled state, and outputs a fixed value to the signal line of the clock signal CLKn in the disabled state.

In the example described above, the n-th drive circuit 31*n* starts the operation of the n-th block BLK in accordance with a write signal OUTn−1(i) generated by an (n−1)-th block. Also, the n-th drive circuit 31*n* causes the operation of the n-th block BLK to end in accordance with a write signal OUTn+1(i) generated by an (n+1)-th block. More specifically, the n-th drive circuit 31*n* starts supplying data ORDatan, OGDatan, and OBDatan to the n-th block BLK in accordance with the write signal OUTn−1(i) generated by the (n−1)-th block. The n-th drive circuit 31*n* also causes the operation of the n-th block BLK in accordance with the write signal write signal OUTn+1(i) generated by the (n+1)-th block. In addition, the n-th drive circuit 31*n* starts supplying a clock signal OCLKn to the n-th block BLK in accordance with the write signal OUTn−1(i) generated by the (n−1)-th block. In addition, the n-th drive circuit 31*n* stops supplying the clock signal OCLKn to the n-th block BLK in accordance with the write signal OUTn+1(i) generated by the (n+1)-th block.

To summarize the above example, the n-th drive circuit 31*n* for the n-th block BLK changes the setting of its mask circuit MSK to the enabled state from the disabled state in response to the output from the i-th-stage flip-flop 41*i* (register) in the (n−1)-th block BLK. In addition, the n-th drive circuit 31*n* for the n-th block BLK changes the setting of its mask circuit MSK to the disabled state from the enabled state in response to the output from the i-th-stage register in the (n+1)-th block BLK.

In the example shown in FIG. 8, the first and second block enable signals Blk1_EN and Blk2_EN change from the disabled state to the enabled state in response to the fall (the change from the enabled state to the disabled state) of the enable signal HSC_EN. As a result, the first and the second blocks BLK are set to an operation-enabled state before the rise of the enable signal HSC_EN. Subsequently, the shift operation performed by the scanning circuit 40 is started when the enable signal HSC_EN rises and (the pulse of) the shift start signal PST is supplied.

After the data write operation of the holding block 501 of the first block BLK (the data reception operation of the holding block 501 of the first block BLK) has been completed, the data write operation of the holding block 501 of the second block BLK is started. The block enable signal Blk1_EN is set to the disabled state while data is being written in the holding block 501 of second block BLK, and the first block BLK that has undergone the data write operation is set to an operation-suppressed state. This operation-suppressed state refers to a case in which the power consumption of the first block BLK set is smaller than that in a case in which the first block BLK is in the operation-enabled state. Typically, this state can be regarded as a state in which there is zero or almost zero power consumption. However, in order to speed up the return to the operation-enabled state from the operation-suppressed state, less power may be consumed in the operation-suppressed state than in the operation-enabled state. In this manner, a mode in which each block is consuming less power than in the operation-enabled state is included in the range of the operation-suppressed state. In addition, the third block BLK is changed to the operation-enabled state when the block enable signal Blk3_EN is set to the enabled state during the data write operation of the holding block 501 of the second block BLK.

After the data write operation of the holding block 501 of the second block BLK has been completed, the data write operation of the holding block 501 of the third block BLK is started. The block enable signal Blk2_EN is set to the disabled state while data is being written in the holding block 501 of third block BLK, and the second block BLK that has undergone the data write operation is set to an operation-suppressed state. In addition, the fourth block BLK is changed to the operation-enabled state when the block enable signal Blk4_EN is set to the enabled state during the data write operation of the holding block 501 of the third block BLK. A similar operation continues hereinafter.

Figure 9:
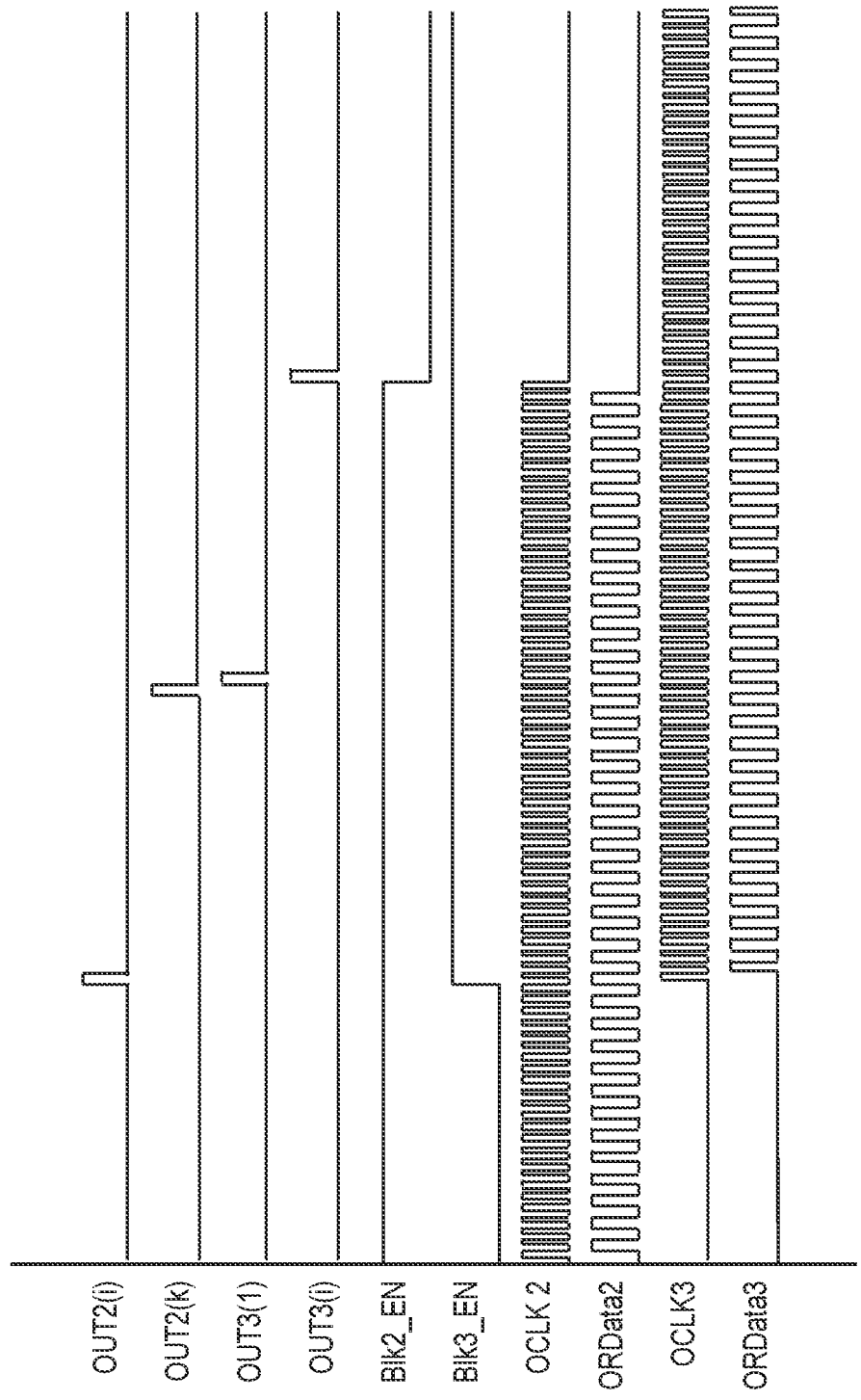
FIG. 9 is a timing chart showing an example of a shift from a data write operation performed on a holding block of a second block to a data write operation performed on a holding block of a third block.

FIG. 9 shows the shift from the data write operation of the holding block 501 of the second block BLK to the data write operation of the holding block 501 of the third block BLK. At the start time (left end) shown in FIG. 9, the data write operation of the holding block 501 of the second block BLK is being performed. When the write signal OUT2(*i*) (for example, i=30) of the second block BLK is set to high level over a predetermined time, data is written in an i-th data holder LA1$i$ of the holding block 501 of the second block BLK. In addition, in response to the write signal OUT2($i$) (for example, i=30) of the second block BLK changing to high level, the third block enable signal Blk3_EN of the third block BLK shifts to high level (enabled state). As a result, the third block BLK is set to the operation-enabled state during the data write operation period of the holding block 501 of the second block BLK. Subsequently, when the write signal OUT2($k$) (for example, k=60) of the second block BLK is set to high level over a predetermined time, data is written in the k-th (final) data holder LA1$k$ of the holding block 501 of the second block BLK.

Next, when the write signal OUT1(1) of the third block BLK is set to high level over a predetermined time, data is written in the first data holder LA11 of the holding block 501 of the third block BLK. Subsequently, in response to the write signal OUT3($i$) (for example, i=30) of the third block BLK changing to high level, the second block enable signal Blk2_EN of the second block BLK shifts to low level (disabled state). As a result, the second block BLK that has already undergone the data write operation is set to the operation-suppressed state while the data write operation of the holding block 501 of the third block BLK is being performed.

According to the operation described above, the (n+1)-th block BLK is set to the operation-enabled state while the data write operation of the holding block 501 of the n-th block BLK is being performed. Hence, the preparation for the data write operation of the holding block 501 of the (n+1)-th block BLK is completed before the data write operation of the holding block 501 of the (n+1)-th block BLK is started. In addition, according to the operation described above, the (n−1)-th block BLK is set to the operation-enabled state during the data write operation of the holding block 501 of the n-th block BLK. Hence, the data write operation of the holding block 501 of the (n−1)-th block BLK will be definitely performed. Therefore, according to this embodiment, an error operation can be prevented even if the frequency (operating frequency) of the reference clock signal CLK increases. That is, this embodiment is advantageous for increasing the operating frequency. Furthermore, according to this embodiment, changes to the current consumption can be reduced because two blocks will be maintained constantly in the operation-enabled state. This is advantageous for suppressing the transient change of the power supply voltage.

In contrast to the embodiment described above, a case in which the (n+1)-th block is set to the operation-enabled state at the deactivation timing of the write signal for writing data in the final data holder of the holding block 501 of the n-th block BLK will be considered. In this case, if the operating frequency is increased, the data supply operation to the first data holder of each holding block 501 of the (n+1)-th block BLK may not be sufficiently performed, and the setup time of the data may become insufficient. This can cause an erroneous data write operation to be performed on the first data holder of the holding block 501 of the (n+1)-th block BLK.

Also, a case in which the n-th block BLK is set to the operation-suppressed state at the deactivation timing of the write signal for writing data in the final data holder of the holding block 501 of the n-th block BLK will be considered. In this case, if the operating frequency is increased, for example, the data hold time may become insufficient because the data supplied to the final data holder of the holding block 501 of the n-th block will not be held sufficiently. This can cause an erroneous data write operation to be performed on the final data holder of the holding block 501 of the n-th block BLK.

In the embodiment described above, the driver unit 30 sets the (n+1)-th block BLK to the operation-enabled state in response to the output from the i-th flip-flop 41$i$ (register) of the n-th block BLK. In addition, the driver unit 30 sets the (n−1)-th block BLK to the operation-suppressed state in response to the output from the i-th flip-flop 41$i$ of the n-th block BLK. However, the timing at which the (n+1)-th block BLK is set to the operation-enabled state and the timing at which the (n−1)-th block BLK is set to the operation-suppressed state may be same as each other or different from each other.

That is, the driver unit 30 may set the (n+1)-th block BLK to the operation-enabled state in response to the output from the i-th flip-flop 41$i$ of the n-th block BLK and set the (n−1)-th block BLK to the operation-suppressed state in response to the output from a j-th flip-flop 41$j$ of the n-th block. In this case, the embodiment described above corresponds to a case in which i=j. In order to reduce the power consumption in this case, it is preferable to shorten the period in which the two blocks are set in the operation-enabled state, that is, it is preferable to set j<i. In addition, it is preferable to set j<(k-i) in consideration of the operation margin.

Figure 10:
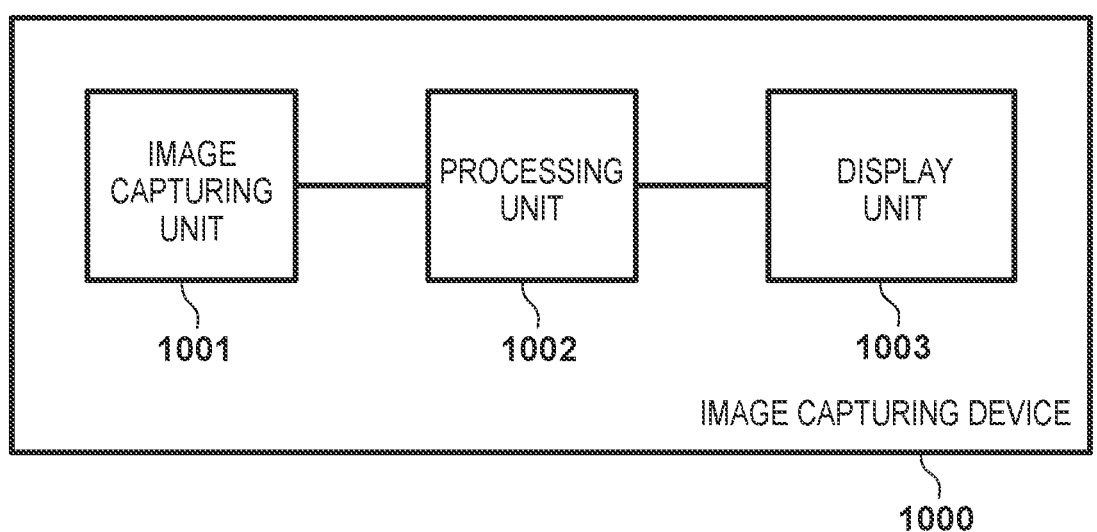
FIG. 10 is a block diagram showing an example of the arrangement of an image capturing device incorporating the display device.

FIG. 10 shows an example of the arrangement of an image capturing device 1000 that incorporates a display unit 1003 represented by the display device 1 according to the embodiment described above. The image capturing device 1000 can include an image capturing unit (image sensor) 1001, a processing unit 1002 that processes an image captured by the image capturing unit 1001, and the display unit 1003 that displays the image processed by the processing unit 1002. For example, the display unit 1003 can display, other than the image captured by the image capturing unit 1001 and processed by the processing unit 1002, information for operating the image capturing device 1000. The concept of the image capturing device can include various kinds of devices that have an image capturing function. The display unit 1003 may be, for example, a back-surface display unit of an image capturing device represented by a digital still camera, a viewfinder, or a display unit arranged in another portion. The viewfinder is a display device arranged inside the finder of the image capturing device.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-209931, filed Nov. 7, 2018, which is hereby incorporated by reference herein in its entirety.

What is claimed is:
1. A display device comprising:
a plurality of pixels arranged so as to form a plurality of rows and a plurality of columns;
a row selection circuit configured to select a row among the plurality of rows; and
a signal supply circuit configured to supply a signal to each pixel of the row selected from the plurality of pixels by the row selection circuit,
wherein the signal supply circuit includes N blocks and a data supply circuit configured to supply data to the N blocks, wherein each of the N blocks includes (a) a holding block including k data holders configured to supply signals to k columns of the plurality of columns, and (b) a scanning circuit block configured to sequentially select the k data holders to receive data from the data supply circuit, and the scanning circuit block includes a k-stage shift register formed from k registers which are connected in series, wherein a scanning circuit is formed by connecting, in series, N scanning circuit blocks, each of which is arranged in the corresponding one of the N blocks, and the scanning circuit sequentially selects the N holding blocks, each of which is arranged in the corresponding one of the N blocks, to sequentially select the k data holders of each selected holding block to receive data, wherein for i<k, in response to an output from an i-th register of an n-th block from the first block, of the N blocks, in the scanning direction of the scanning circuit, the data supply circuit sets an (n+1)-th block from the first block of the N blocks in an operation-enabled state, and wherein for j<k, the data supply circuit sets an (n−1)-th block from the first block of the N blocks in an operation-suppressed state in response to an output from a j-th register of the n-th block.

2. The device according to claim 1, wherein in response to the output from the i-th register of the n-th block, the data supply circuit starts supplying data to the (n+1)-th block.

3. The device according to claim 2, wherein for j<k, data supply to an (n−1)-th block from the first block of the N blocks is completed in response to an output from a j-th register of the n-th block.

4. The device according to claim 3, wherein the data supply circuit includes N drive circuits corresponding to the N blocks, respectively, and each of the N drive circuits includes a mask circuit configured to output data corresponding to input data in an enabled state and to output a fixed value in a disabled state, and wherein an n-th drive circuit corresponding to the n-th block causes the mask circuit of the n-th drive circuit to shift from the disabled state to the enabled state in response to an output from an i-th register of the (n−1)-th block and causes the mask circuit of the n-th drive circuit to shift from the enabled state to the disabled state in response to an output from a j-th register of the (n+1)-th block.

5. The device according to claim 2, wherein in response to the output from the i-th register of the n-th block, the data supply circuit starts an operation to supply a clock signal, used to cause the scanning circuit to operate, to the (n+1)-th block.

6. The device according to claim 5, wherein for j<k, the data supply circuit completes the operation to supply the clock signal to an (n−1)-th block in response to an output from a j-th register of the n-th block.

7. The device according to claim 6, wherein the data supply circuit includes N drive circuits corresponding to the N blocks, respectively, and each of the N drive circuits includes a mask circuit configured to output the clock signal in accordance with a reference clock signal in an enabled state and to output a fixed value in a disabled state, and wherein the n-th drive circuit corresponding to the n-th block causes the mask circuit of the n-th drive circuit to shift from the disabled state to the enabled state in response to an output from an i-th register of the (n−1)-th block and causes the mask circuit of the n-th circuit to shift from the enabled state to the disabled state in response to an output from a j-th register of the (n+1)-th block.

8. The device according to claim 1, wherein the signal supply circuit includes a holder array configured to receive, at once, data from each of the N holding blocks arranged in the N blocks and a DAC array configured to convert data provided from the holder array into an analog signal.

9. An image capturing device comprising:
an image capturing unit; and
a display device defined in claim 1 and formed as a display unit configured to display an image obtained from an image captured by the image capturing unit.

* * * * *